Patented Jan. 19, 1937

2,067,957

UNITED STATES PATENT OFFICE 2,067,957

CINEMATOGRAPHIC FILM

Hans von Fraunhofer, New York, N. Y., assignor to Trichrome, Inc., New York, N. Y., a corporation of New York Application December 1, 1934, Serial No. 755,581

10 Claims. (Cl. 88—16.4)

This invention relates to cinematographic films, being particularly directed to films in color, and methods of producing the same.

Up to the present time, colored cinematographic films have been produced in accordance with the additive or subtractive principles, both of which have advantages with respect to one another, but each of which has inherent disadvantages. As far as color rendition is concerned, operation under the additive method produces better colors than are available through the subtractive method; however, under such procedure the problem involving elimination of such inherent difficulties as flicker and fringing have not yet been solved. The subtractive principle, on the other hand, suffers from inability to obtain a proper color rendition, and in view of the very complicated technique of obtaining color, such procedure is inefficient and very expensive.

Broadly, it is an object of this invention to provide for a method of producing cinematographic films in color, whereby certain phases incorporating the advantageous features of both the additive and subtractive principles are combined.

Further, it is an object of this invention to provide for a cinematographic film in color through the medium of a differential treatment of alternate frames for both negatives and positives, the essence of the process comprising of participation of the warmer color values in all frames and a differential participation in alternate frames of the respective colder color values.

Specifically, this invention contemplates in a cinematographic film for color the sensitization and treatment of all frames for the warmer color values, while alternate frames are in addition sensitized and treated for the colder color value green, thereby providing essentially for a series of frames having a participation broadly of the warmer color values and the blue and blue violet values of the colder colors, while frames alternating with the above have a participation of the warmer color values and the green value of the colder colors, thereby producing a cinematographic film in color wherein images of the exposed subject in alternate frames contain the same color values but adjacent frames contain different color values; such different color values, to wit: the blue and blue violet on the one hand and the green on the other, both being cold color values, readily mix without flicker in projection at or below the standard projection speeds.

Figure 1:
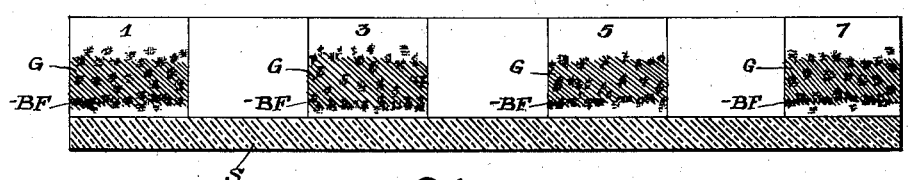

These and other advantages, capabilities and features of the invention will appear from the subjoined detailed description of one specific embodiment thereof illustrated in the accompanying drawing, in which Figure 1 is a front elevation in section graphically representing the film after the first sensitizing step.

Figure 2:
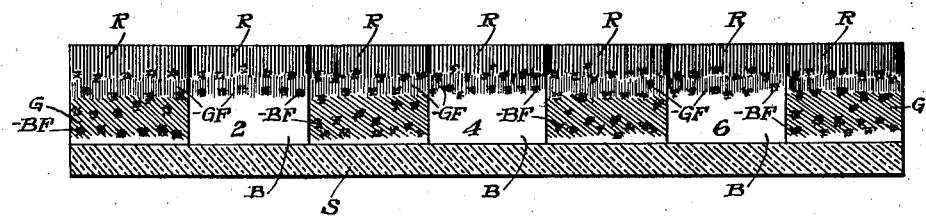

Figure 2 is a plan elevation in section showing the film after the complete sensitization.

To carry out my invention I take a standard moving picture film and first treat alternate frames indicated as "1", "3", "5" and "7" in the drawing, with a green sensitizer, such as pinaflavol or erythrosin, together with a small quantity of a minus blue filter dye as, for example, rapid filter yellow, the treatment being carried out in a wiping or spraying operation, whereupon the sensitizer, due to its properties, penetrates into the gelatin towards the lower level of the film forming the stratum marked "G" adjacent the support "S" shown in Figure 1 of the drawing, the rapid filter yellow being dispersed throughout the emulsion but predominantly in the lower level, the same being designated by the letters "minus BF". The film may then be dried for a short period. Thereafter, I coat the whole film with a solution incorporating a red sensitizing dye, such as a colloidal suspension of pinacyanol, to which has been added small quantities of the minus blue filter dye, rapid filter yellow, and the minus green filter dye, rose bengal. The pinacyanol forming the red sensitizer penetrates very slowly into the gelatine forming a stratum near the top of the film marked "R" in Figure 2 of the drawing, while the filter dyes, rose bengal, having minus green value, and rapid filter yellow, having minus blue value, penetrate towards the support marked "S", the distribution of the rapid filter yellow being substantially towards the lower stratum and the rose bengal in an area contiguous to both the upper and lower strata, the respective filter dyes being marked "minus BF" and "minus GF". The film may now be dried preparatory to exposure.

It should be noted in the even numbered frames marked "2", "4" and "6", that the lower stratum, which has not been treated or affected by the sensitizing reagents, is by virtue of the properties of all monochromatic films, preponderantly sensitive to blue and blue violet values and as such has been indicated as "B" in Figure 2 of the drawing.

After exposure the film is developed, fixed and washed, after which the film is immersed in a toning solution incorporating uranium nitrate, potassium ferri-cyanide in acid solution, whereupon the silver in the red sensitive layer is converted into a red image, while at the same time the gelatin adjacent the converted silver in the red sensitive layer is tanned or hardened. The film is then washed to remove excess of the toning reagent.

Thereafter, the odd numbered frames, "1", "3" and "5" in the drawing, are treated as by wiping or spraying with a solution of pinatype complementary green D, a green dye acting solely on the silver record and the gelatin, particularly in the area where green color record has been established; after this operation the green frames are covered by a wiping or spraying operation with a solution of amyl acetate to protect the green images from the effects of a blue dye comprising the next step.

Thereafter, the film is immersed in a dye, as, for example, pinatype blue F or D, which colors the silver and gelatin deposits in the even frames of the lower stratum incorporating the color record of the values blue and blue violet to a substantially blue and blue violet coloration, this dye having no effect on the converted silver in the red sensitive layer and very little effect on the hardened gelatin in the red sensitive layer. The film is then dried and prepared for printing positives.

Although various methods may be applied for printing of positive films, I prefer to prepare my positives with respect to the sensitization steps, in the same manner as that indicated relative to the negatives, since by such procedure I obtain a translation of color values, both as to color rendition and density.

Although I have indicated certain specific sensitizers, filter dyes, toning reagents, and coloring dyes, I do not limit myself to the use of only these reagents, the same having been indicated as representative media capable of producing the desired result; nor do I limit myself as to the procedural steps specified in my preferred method, the essence of my invention being directed to the production of a film by combining the principles of additive and subtractive analysis and synthesis under one procedure.

Although I have shown the application of sensitizing dyes in conjunction with filter dyes, it is within the province of this invention to eliminate the use of filter dyes applied as the solution to the emulsion and to apply in place thereof physical filter plates in conjunction with the camera, the rose bengal filter being applied in the exposure of the even numbered frames and the yellow filter being applied for the photographing of the odd numbered frames. Further, it is within the province of this invention in the event of sensitizing at the source, to provide for the red sensitization of all frames in a zone adjacent the support and the green sensitization of alternate frames in a zone distant from the support.

It is obvious that various changes and modifications may be made to the details of construction without departing from the general spirit of the invention as set forth in the appended claims.

I claim:

1. In the art of cinematography, a film for exposure having a series of frames, all the frames of which are sensitized in a zone contiguous to the surface thereof for recording warmer color values only, and the alternate frames of which are in addition sensitized at a zone intermediate the surfaces of the film for recording at least one of the colder color values, the remaining alternating frames at the intermediate zone not being specially sensitized for such one of the colder color values.

2. In the art of cinematography, a film for exposure having a series of frames, all the frames of which are sensitized for the color red and alternate frames of which are sensitized for the colors green and red, the remaining alternate frames not being specially sensitized for the color green.

3. In cinematography, a stratified film for exposure having a series of frames, each frame of which is sensitized in one stratum to record red color values only and alternate frames of which are sensitized in a stratum adjacent the red sensitized stratum to record green color values in addition to the red color values, the remaining alternate frames not being specially sensitized in the last-named stratum.

4. In cinematography, a stratified film for exposure, each frame of which is sensitized in one stratum to record red color values and alternate frames of which are sensitized in an adjacent stratum to record green color values, the remaining alternating frames not being specially sensitized in such adjacent stratum, the strata of each frame having incorporated therein filter media for the colder colors.

5. In the art of cinematography, in a film having a series of frames and normally having properties of recording a group of colder color values, all the frames of which are sensitized in a zone contiguous to a surface thereof for recording the warmer color values, and the alternate frames of which are sensitized in a zone intermediate the surfaces thereof for recording color values of another group of colder colors, the intermediate zone in the remaining alternating frames not being specially sensitized, thereby to provide for the recordation of the warmer and both groups of colder color values in alternate frames, and the warmer colors and one of the groups of colder color values in the remaining frames.

6. In cinematography, the method of treating a film having a series of frames, comprising sensitizing alternate frames thereof to record at least one of the colder color values, the remaining alternating frames not being specially sensitized for one of the colder color values, and sensitizing all frames thereof to record the warmer color values, exposing the film, and after developing and hypoing, staining the alternate frames, converting the silver record of the warmer color values, and dyeing the silver record of the colder color values.

7. In color cinematography, a method of treatment of film having a series of frames, comprising subjecting alternate frames thereof to a sensitizing reagent for at least one of the colder colors, the remaining alternating frames not being specially sensitized for such one of the colder colors, and thereafter subjecting all the frames thereof to sensitizing reagent for the warmer colors.

8. In color cinematography, a method of treatment of film having a series of frames, comprising subjecting alternate frames thereof to a sensitizing reagent for at least one of the colder colors, the remaining alternating frames not being specially sensitized for such one of the colder colors thereafter subjecting all the frames thereof to sensitizing reagent for the warmer colors, and incorporating filter dyes for controlling the recordation of color values in only the zones sensitized for such colors.

9. In color cinematography, a method of treatment of film having a series of frames, comprising treating alternate frames with a sensitizing reagent forming a stratum for recording at least one of the colder colors substantially intermediate of the film surfaces, the last-named stratum in the remaining alternate frames not being sensitized for such one of the colder colors and thereafter subjecting all of the frames to a sensitizing reagent for forming a stratum adjacent the intermediate stratum and contiguous to a surface of the film for recording the warmer colors.

10. In color cinematography, a method of treatment of film, comprising treating alternate frames with a sensitizing reagent forming a stratum for recording at least one of the colder colors adjacent the entrant surface of the film, the last-named stratum in the remaining alternate frames not being sensitized for such one of the colder colors, and thereafter subjecting all of the frames to a reagent for sensitizing a stratum of the film adjacent the emergent face thereof, to record the softer colors, and treating all of the frames of the film with filter dyes for controlling the recordation in the respective strata only of the color values to which such strata have been sensitized.

HANS von FRAUNHOFER.